UNITED STATES PATENT OFFICE.

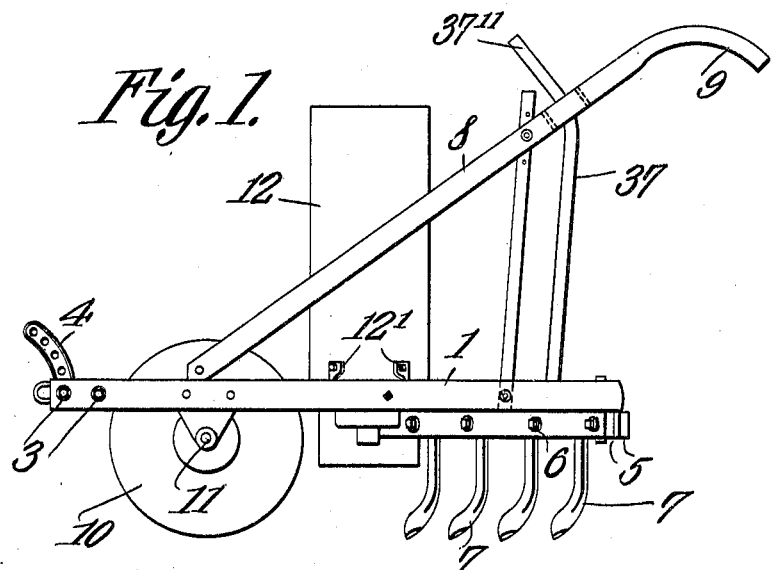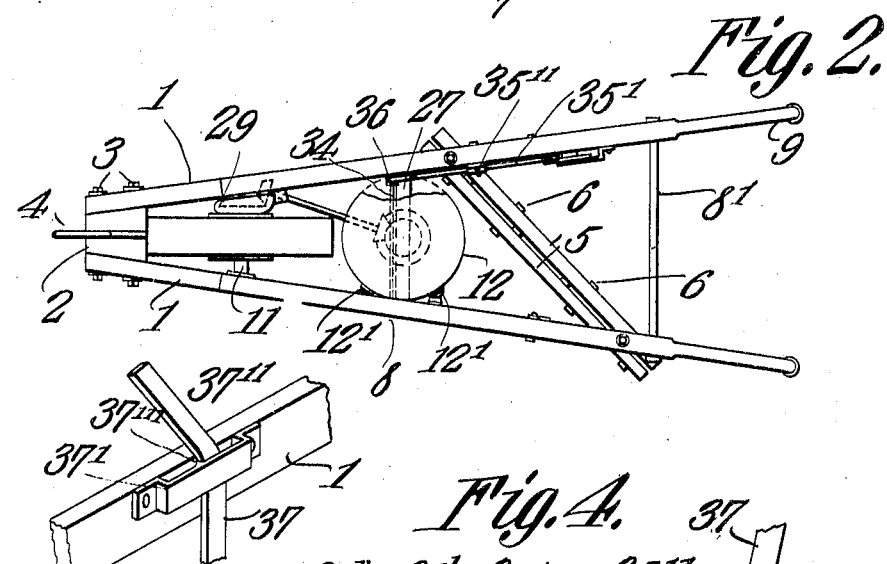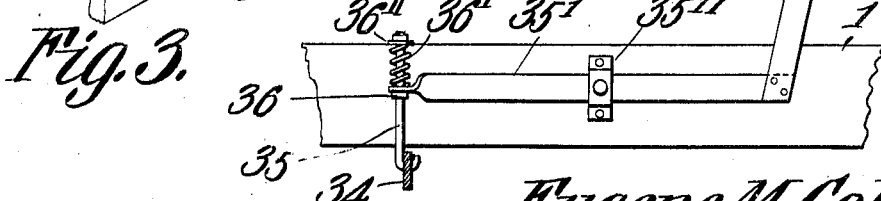

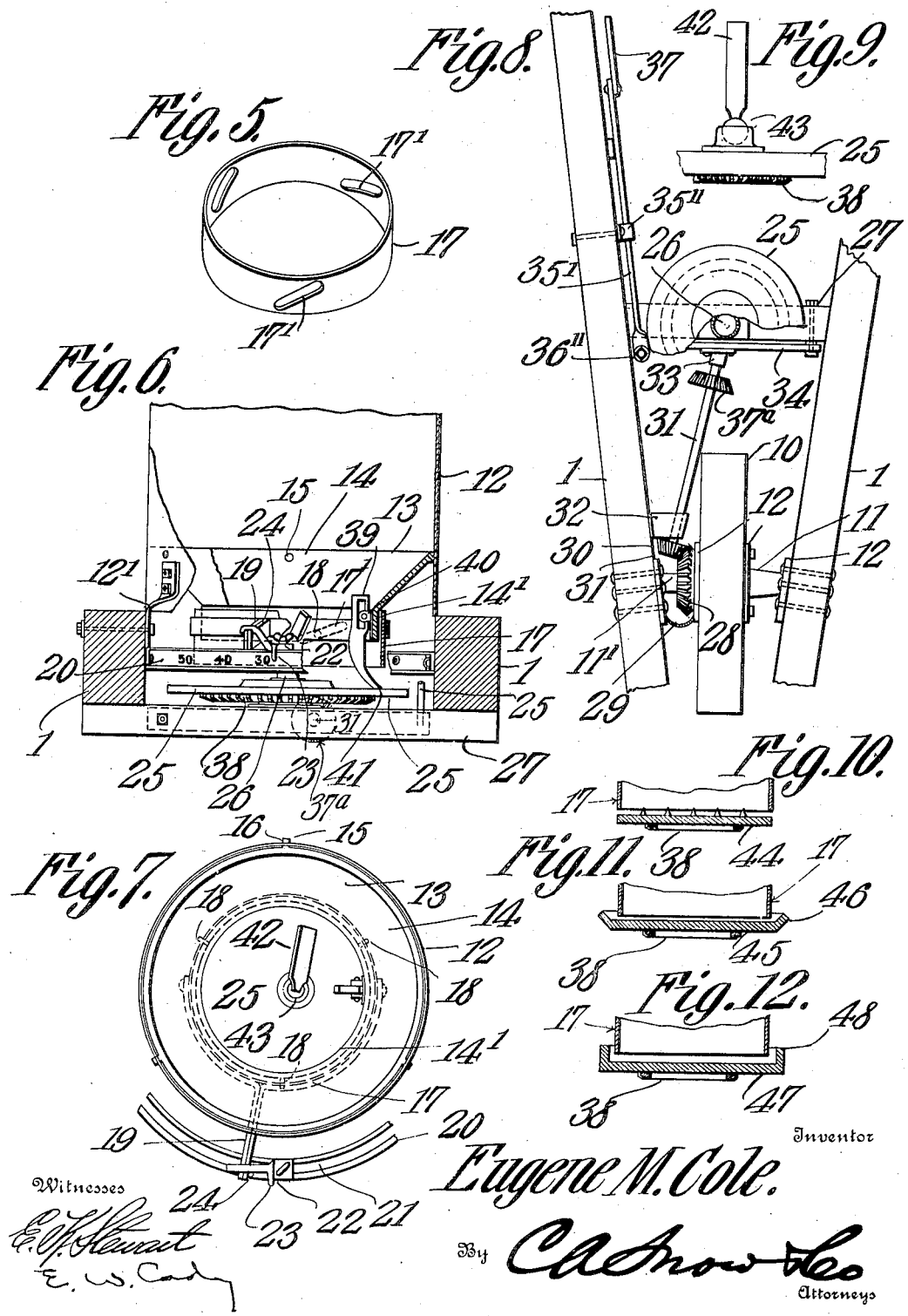

EUGENE MACON COLE, OF CHARLOTTE, NORTH CAROLINA.

COMBINED FERTILIZER-DISTRIBUTER AND CULTIVATOR.

No. 897,456.　　　　Specification of Letters Patent.　　　Patented Sept. 1, 1908.

Application filed March 10, 1908. Serial No. 420,220.

*To all whom it may concern:*

Be it known that I, EUGENE MACON COLE, a citizen of the United States, residing at Charlotte, in the county of Mecklenburg and State of North Carolina, have invented a new and useful Combined Fertilizer - Distributer and Cultivator, of which the following is a specification.

This invention relates to fertilizer distributers and cultivators, and has for its object to provide a new and improved fertilizer distributer and cultivator combined in one machine.

The invention covers an improved distributer for guano or other commercial fertilizer, which is also adapted to be used as a cultivator for any crop, either putting out fertilizer at the same time or not, as desired, one object being to provide a better means of sowing the fertilizer in large or small quantities and at a uniform rate.

Another object is to provide means for sowing fertilizer in a furrow or elsewhere, and at the same time thoroughly mixing the fertilizer with the soil and covering it.

Another object is to provide a machine for applying fertilizer to a growing crop and at the same time mixing the fertilizer with the soil and cultivating the crop effectually at one and the same operation.

Another object is to provide a machine which will distribute the fertilizer over a broad space rather than in a compact stream and in one narrow furrow.

The invention consists in a combined fertilizer distributer and cultivator, and in the details thereof as herein set forth and claimed.

Referring to the accompanying drawings, in which similar numerals indicate like parts, Figure 1 is a side view of a machine constructed in accordance with this invention. Fig. 2 is a plan view thereof. Fig. 3 is an enlarged detail view of the operating lever and its support. Fig. 4 is an enlarged detail view of a portion of the operating lever mechanism. Fig. 5 is a detail view of a portion of the fertilizer distributing mechanism. Fig. 6 is a view in elevation of a portion of the casing removed, showing partly in section the apparatus for distributing the fertilizer. Fig. 7 is a plan view thereof. Fig. 8 is a plan view looking from the under side of a portion of the frame of the machine showing the mechanism for operating the distributer. Fig. 9 is a detail view, partly in section, of an agitating device. Figs. 10, 11 and 12 are detail views in transverse section of modifications of the fertilizer distributing plate.

In carrying out the invention, a frame is provided, consisting of two bars 1, 1 connected at their forward ends by a block 2 secured by bolts 3 having mounted upon said block and held by one of the bolts 3 a link 4. The rear end of the side bars 1, 1 are connected and held together by two parallel strips or bars 5 secured to the bars 1, 1 and held together by bolts 6. Between these bars 5 are mounted a number of cultivator teeth 7. Mounted upon the side bars 1 are diagonal arms 8 held together at their upper ends by a rod 8' and terminating in handles 9 for directing the machine.

10 is a supporting wheel for the forward end of the machine, said wheel being mounted on shafts 11, 11' having their bearings in the side bars 1.

12 is the distributing hopper which may be formed of sheet metal and is mounted by means of brackets 12' on the side bars 1, 1. Within the hopper 12 adjacent to its lower end is mounted a funnel 13 having tapering sides 14, and a flange or depending mouth 14'. The funnel 14, which is of ring shape, is secured to the hopper 12 by means of pins 15 which project through holes 16 in the side of the hopper. The funnel 14 may be slipped into place by pushing it down at an angle, and as the sides of the hopper 12 are flexible they will yield so as to push the funnel 14 into place and permit the pins 15 to engage the holes 16 in the hopper.

Encircling the flange 14' of the funnel 14 and being a little larger in circumference than the flange 14' in order that it may rotate freely about it, is a ring 17 of a width somewhat greater than the flange 14' and depending below the lower end of the same. The ring 17 is adjustably mounted in the flange 14' by means of inclined slots 17' engaging pins 18 mounted on the sides of the flange 14'. The ring 17 is rotated by means of a handle 19 projecting radially therefrom. By rotating the ring 17 to and fro, it is caused to be raised and lowered by means of its connection with the slots 17' and pins 18.

Adjacent to the handle 19 is mounted on the frame supporting the hopper, a circular bar 20 having a scale and upon said bar 20 is mounted a bracket and set screw 22 carrying a depending marker or pin 23 adapted to move over the indicator or scale on the bar 20. The bracket 22 is provided with an arm 24 which engages the handle 19 whereby when the handle 19 is moved, the pin 23 will be moved over the scale on the bar 20 and indicate the quantity of fertilizer distributed to the acre. Located beneath the ring 17 and somewhat wider than the same is a circular plate or disk 25 having a central pivotal bearing at 26 on the cross bar 27 supported by the arms 1.

The mechanism for operating the disk 25 is as follows:—Mounted on the shaft 11' of the wheel 10 and secured thereto to turn therewith, is a bevel gear wheel 28 inclosed in a casing 29 mounted on the said bar 1, said gear wheel 28 meshing with a bevel pinion 30 on the end of a shaft 31 bearing at one end in a bracket 32 on the side bar 1, and bearing at the other end in a socket 33 mounted on a lever arm 34 pivoted at one end to the cross bar 27 and pivoted at its other end to the lower hook end of a rod 35 see Fig. 4, passing through a hole in one end of a lever 35' pivoted in a bracket 35" and having its outer end bearing on a nut 36 on the rod 35, and on said rod 35 is mounted a coiled spring 36' located between the end of lever 35' and a nut and washer 36" on the upper end of the rod 35. The other end of the lever 35' is provided with a lever arm 37 see Fig. 3 projecting through a keeper 3_{\iota}' and terminating in a handle 37" which may be locked in adjusted position by engaging a stop or catch 37''' on the keeper, by means of which the lever arm 34 is operated. Upon the shaft 31 adjacent to one end is a bevel pinion 37$^a$ engaging a bevel gear 38 on the under side of the disk 25. By means of this gear mechanism hereinbefore described, the movement of the wheel 10 causes the disk 25 to be rotated. Mounted on the inner face of the flange 14' is a scraper 39 secured to said flange by means of a connection 40 and having its lower scraping end 41 adjacent to the top of the disk 25, whereby the fertilizer may be scraped off and kept from sticking to the disk 25. Upon the top of the disk 25 and a little eccentric thereto, is mounted a stirring or agitating arm 42 connected to the disk 25 by a ball and socket joint 43.

The operating mechanism hereinbefore described is thrown into and out of gear by the lever mechanism operated by the handle 37". By pushing the handle 37" forward, the lever 34 and shaft 31 are lowered, and the bevel pinion 37$^a$ is disengaged from the gear 38 on disk 25, thereby causing the latter to cease to revolve. By pulling the lever 37 back, the lever 34 is raised, bringing the pinion 37$^a$ into mesh with the gear 38 on disk 25. The spring 36' serves to provide a cushioning or yielding engagement of pinion 37' with gear 38, so that when the pinion 37$^a$ is moved up to gear 38, and they do not immediately engage, the spring 36' will act to pull them into engagement.

The operation of the device is as follows:— The fertilizer is placed in the hopper 12 to be carried down through the funnel 13 onto the disk 25, and the disk 25 being rotated by the movement of the wheel 10 communicated through the gear mechanism to said disk 25, the fertilizer will be carried out laterally to and off of the edges of the disk 25 and between the latter and the lower edge of the ring 17. By adjusting the valve ring 17 to a raised or lowered position, the amount of fertilizer passing between the disk 25 and the lower edge of the valve ring 17 will be regulated. In the rotation of the disk 25, the scraper 39 by means of its lower end 41, keeps the surface of the disk 25 from gumming up with the damp sticking parts of the fertilizer. The agitating arm 42 is swung in the ball and socket joint 43 by the movement of the disk 25 and being somewhat off the center, will have a swinging movement to prevent the fertilizer from choking or bridging over the opening in the hopper 13. The fertilizer is fed out over the edge of the disk 25 by centrifugal force and the mass of fertilizer resting on the central portion of said disk further aids in the discharge through the circular opening below the valve ring 17, and spreads the fertilizer on the ground in a broad stream, as wide as or wider than the diameter of the disk 25.

This construction permits of the free movement of the fertilizer and avoids gumming and clogging up around the bottom of the hopper. The advantage of this construction lies in having the disk beneath the hopper instead of inside of it, and accomplishing the feeding by centrifugal force aided by the weight of the central mass on the disk, thereby avoiding the use of a gate that may gum up and choke, and secure the uniform flow and scattering of the fertilizer over a space as wide at least as the diameter of the disk.

In lieu of the disk 25 other forms may be used, as shown in Figs. 10, 11 and 12. In Fig. 10 the disk 44 may be employed of the same diameter as the bottom of the ring 17. This form is adapted to sow very large quantities. In Fig. 11, disk 45 is provided with an upwardly inclined flange 46 outside of the ring 17. This form is adapted to sow small quantities. In Fig. 12 the disk 47 has a vertical turned up flange 48 outside of the lower end of the ring 17. In lieu of the ring 17 being raised or lowered, the ring 17 may be fixed, and the disk 25 raised and lowered to and from the ring, or instead of the movable ring, the hopper itself may be raised and lowered to and from the disk, the same result being accomplished as in the case of a movable ring.

What is claimed is:—

1. In a fertilizer distributer, a hopper, a revoluble discharge disk arranged below the bottom of the hopper and of a diameter greater than the discharge opening of the hopper, and a vertically adjustable valve ring carried by the hopper and movable to adjust the vertical height of the passage between the disk and the lower edge of the ring.

2. In a fertilizer distributer, a hopper having a funnel shaped bottom terminating in a flanged discharge neck, a valve ring mounted on the neck and provided with a plurality of inclined slots, pins projecting from the neck and adapted to said slots, the ring being circumferentially adjustable to alter the quantity of fertilizer distributed, and a rotatable discharge disk located below and of greater diameter than said valve ring.

3. In a fertilizer distributer, a hopper having a funnel shaped bottom terminating in a discharge neck, a plurality of pins extending from said neck, a circumferentially adjustable valve ring arranged around the neck and provided with a plurality of inclined slots for the reception of said pin, a revoluble discharge disk arranged below and of greater diameter than the ring, a discharge finger carried by the neck and loosely resting on the disk at a point near the periphery thereof, and an agitating finger carried by said disk.

4. In a fertilizer distributer, a hopper having a funnel shaped bottom terminating in a discharge neck, a plurality of pins extending from the neck, a circumferentially adjustable valve ring having slots for the reception of said pin, a revoluble discharge disk located below the ring, and a loosely mounted agitating finger supported by the disk and having a ball and socket connection therewith at a point distant from the center of said disk.

5. In a machine of the class described, a wheeled frame, a bevel gear carried by the wheel, a hopper having a funnel shaped bottom terminating in a discharge neck, a valve ring carried by the neck and adjustable to vary the quantity of fertilizer discharged, a discharge disk mounted below the neck and having a bevel gear on its lower face, a shaft, a pair of pinions mounted thereon and forming a driving connection between the two bevel gears, a pivotally mounted lever having a bearing for one end of the shaft, and an adjusting means connected to said lever for raising and lowering the same and thus connecting and disconnecting the train of gearing.

In testimony that I claim the foregoing as my own, I have hereto affixed my signature in the presence of two witnesses.

EUGENE MACON COLE.

Witnesses:
A. M. PITMAN,
J. H. ALLEN.